United States Patent [19]

Tuczek

[11] Patent Number: 4,815,751
[45] Date of Patent: Mar. 28, 1989

[54] LEVEL AND INCLINATION REGULATION FOR A VEHICLE

[76] Inventor: Franz Tuczek, Dr.-Ing., 7530 Pforzheim, Fed. Rep. of Germany

[21] Appl. No.: 11,300

[22] Filed: Feb. 4, 1987

[30] Foreign Application Priority Data

Feb. 8, 1986 [DE] Fed. Rep. of Germany ....... 3604068
Nov. 22, 1986 [DE] Fed. Rep. of Germany ....... 3639995

[51] Int. Cl.$^4$ ...................... B60G 19/04; B60G 21/06
[52] U.S. Cl. ................................... 280/840; 280/702; 280/714; 280/DIG. 1
[58] Field of Search ................. 280/DIG. 1, 711, 708, 280/714, 6 H, 6 R, 104

[56] References Cited

U.S. PATENT DOCUMENTS

| 2,687,311 | 8/1954 | Nallinger | 280/DIG. 1 |
| 2,882,068 | 4/1959 | Faiver | 280/711 |
| 2,969,990 | 1/1961 | Szostak | 280/DIG. 1 |
| 3,038,739 | 6/1962 | Vogel | 280/DIG. 1 |
| 4,593,920 | 6/1986 | Natsume et al. | 280/6 R |
| 4,702,490 | 10/1987 | Yamaguchi et al. | 280/DIG. 1 |

FOREIGN PATENT DOCUMENTS 1122386 1/1962 Fed. Rep. of Germany .
3427902 2/1986 Fed. Rep. of Germany .

*Primary Examiner*—David M. Mitchell
*Assistant Examiner*—Karin L. Ferriter

*Attorney, Agent, or Firm*—Wenderoth, Lind & Ponack

[57] ABSTRACT

A level and inclination regulating arrangement for a vehicle includes a compressor having an inlet chamber and an outlet chamber. At least two pneumatic or hydropneumatic resilient elements are each associated with one wheel of an axle of the vehicle and include a movable separating piston which is acted upon at one side by the wheel load, and a housing confining a gas cushion which exerts pneumatic pressure on and supports the separating piston at the other side. Supply and discharge conduits connect each of the gas cushions with the outlet chamber and with the inlet chamber of the compressor, respectively. An accumulator is incorporated into at least one of the supply and discharge conduits which communicates with the respective one of the outlet and inlet chambers. Position regulating elements are respectively associated with the resilient elements and are operative for detecting the position of the separating piston with respect to a desired position and for controlling the discharge of gas from the respective gas cushion into the discharge conduit and the supply of gas from the supply conduit into the respective gas cushion in dependence on the deviation of the respective separating piston from its desired position. A control valve selectively connects the accumulator with and disconnects the same from the connection through the respective one of the supply and discharge conduits.

9 Claims, 3 Drawing Sheets

LEVEL AND INCLINATION REGULATION FOR A VEHICLE

BACKGROUND OF THE INVENTION

The present invention relates to vehicle suspensions in general, and more particularly to an arrangement for regulating the level and inclination of a vehicle.

There are already known various constructions of level and inclination regulating arrangements for vehicles. An arrangement of this type usually includes at least two pneumatic or hydropneumatic resilient elements each of which is associated with a different wheel of an axle or a side of the vehicle. The resilient elements include a movable separating piston which is loaded on its one side by the wheel load and on its other side by a supporting pressure of a gas cushion which is confined in a housing and supports the separating piston.

Resilient elements of this type render it possible to achieve level and inclination regulation of the vehicle by adjusting the oil quantity or the gas amount to a static change in the wheel load during the loading and unloading of the vehicle, and to a quasi-static change render the wheel loading in driving conditions which are influenced by mass forces during the negotiation of curves or during breaking or acceleration.

In a known hydraulic-pneumatic resilient arrangement of this type, which is disclosed in the published German patent application No. DE-AS 11 22 286, a level and an inclination regulation for a four-wheel vehicle is achieved by using three level regulating devices arranged between the wheels and the superstructure. Such regulating arrangements influence the oil quantity by adding oil to or removing oil from the oil quantity. The resilient arrangement further includes four filling regulators each of which is connected with a separating piston and which are operative for displacing the separating pistons back toward a central position by adding or removing gas. Both the oil quantity and the gas amount are variable and, therefore, the expense incurred in constructing the position regulating arrangement of this type is disadvantageously high.

There is also known, from the published German patent application No. DE-OS 34 27 902, a regulating arrangement of the above-mentioned type with a fitting adjustment of the gas amount, in which position regulating elements are provided which are respectively associated with the individual ones of the resilient elements and which detect the position of a separating piston with respect to a desired position and, when a deviation from such a desired position is encountered and detected, cause gas to be discharged from the resilient element through a discharge conduit into a low-pressure accumulator, or cause gas to be supplied to the respective resilient element through a supply conduit from a high-pressure accumulator which is being charged with relatively high pressurized gas by a compressor which withdraws the gas from the low-pressure accumulator.

In addition thereto, there are provided, for a resilient group including two resilient elements which provide a supporting moment in driving conditions that are influenced by mass forces, respective devices which effect direct gas flow from the gas cushion of that one of the resilient elements which is extended into the gas cushion of the other resilient element which is retracted, wherein the connections of the discharge conduits to the low-pressure accumulator and of the supply conduits to the high-pressure accumulator are closeable. A multitude of auxiliary means in the form of two gas accumulators, two compressors and a plurality of regulating elements in the discharge and supply conduits are required in this construction, in a very expensive manner, for the achievement of the level of inclination regulation.

SUMMARY OF THE INVENTION

Accordingly, it is a general object of the present invention to avoid the disadvantages of the prior art.

More particularly, it is an object to the present invention to provide a level and inclination arrangement for vehicles, which does not possess the drawbacks of the known arrangements of this type.

Still another object of the present invention is to devise an arrangement of the type here under consideration which is significantly simplified in its construction relative to those of the prior art.

It is yet another object of the present invention to design the above arrangement in such a manner as to achieve highly accurate and properly sensitive vehicle level or inclination adjustment, despite the simplified construction of the arrangement.

A concomitant object of the present invention is to construct the arrangement of the above type to be relatively simple in construction, inexpensive to manufacture, easy to use, and yet reliable in operation.

In keeping with these objects and others which will become apparent hereafter, one feature of the present invention resides in a level and inclination regulating arrangement for a vehicle which comprises a compressor having an inlet chamber and an outlet chamber; at least two pneumatic or hydropneumatic resilient elements each associated with one wheel of an axle of the vehicle and including a movable separating piston which is acted upon at one side by the wheel load, and a housing confining a gas cushion which exerts pneumatic pressure on and supports the separating piston at the other side; supply and discharge conduit means connecting each of the gas cushions with the outlet chamber and with the inlet chamber of the compressor, respectively; at least one accumulator incorporated into at least one of the supply and discharge conduit means as a separate branch thereof which communicates with the respective one of the outlet and inlet chambers; position regulating elements respectively associated with the resilient elements and operative for detecting the position of the separating piston with respect to a desired position and for controlling the discharge of gas from the respective gas cushion into the discharge conduit means and the supply of gas from the supply conduit means into the respective gas cushion in dependence on the deviation of the respective separating piston from the desired position thereof; and control valve means for selectively including the accumulator into and excluding the same from the connection through the one of the supply and discharge conduit means.

Advantageously, the accumulator is a low-pressure accumulator and is incorporated in the discharge conduit means; and a static level regulation takes place when the control valve means connects the gas volume of the low-pressure accumulator, while the compressor directly transfers gas from the gas cushion of that of the resilient elements which is extended into the gas cushion of the other of the resilient elements that is retracted when the control valve means disconnects the gas volume of the low-pressure accumulator for an immediate compensation for a lateral inclination during dynamic driving movements. According to another aspect of the present invention, the accumulator is a high-pressure accumulator and is incorporated in the supply conduit means, and a static level regulation takes place when the control valve means connects the gas volume of the high-pressure accumulator, while the compressor directly transfers gas from the gas cushion of that of the resilient elements which is extended into the gas cushion of the other of the resilient elements that is retracted when the control valve means disconnects the gas volume of the high-presssure accumulator for an immediate compensation for a lateral inclination during dynamic driving movements. It is, however, particularly advantageous when the control valve means includes first and second control valves for selectively incorporating the accumulator into the supply and discharge conduit means, respectively, to serve as one of a low-pressure and a high-pressure accumulator, and when a static level regulation takes place when the pressure in the accumulator is lower than that in the respective resilient element with the first control valve being open and the second control valve being closed, and when the pressure in the accumulator is higher than that in the respective resilient element with the first control valve being closed and the second control valve being open, while the compressor directly transfers gas from the gas cushion of that of the resilient elements which is extended into the gas cushion of the other of the resilient elements that is retracted when both of the first and second control valves disconnect the gas volume of the accumulator for an immediate compensation for a lateral inclination during dynamic driving movements.

It is advantageous in this context when both of the first and second control valves are open for load equalization; and when there are further provided additional valve means in at least one of the supply and discharge conduit; means for automatically closing off gas flow through the first control valve when the pressure in the accumulator exceeds that in the resilient element, in response to such reduced pressure in the resilient element, and through the second control valve when the pressure in the accumulator is below that in the resilient element, in response to such increased pressure in the resilient element. Advantageously, the position regulating elements are constituted by self-positioning control slides that are connected with the respective separating piston. It is also advantageous when each of the resilient elements includes a cylinder and a piston movable in the cylinder, and abutments which delimit the extent of displacement of the piston of the resilient element to an effective range, and when the resilient elements fully support the vehicle superstructure and stabilize the same during driving conditions which are influenced by mass forces.

According to another advantageous concept of the present invention, there is provided a level adjustment device which is selectively switchable on and off, while the compressor transfers gas directly from the gas cushion of that of the resilient elements which is extended into the gas cushion of the other of the resilient elements that is retracted when the control valve means disconnects the gas volume of the accumulator for an immediate compensation for a lateral inclination during dynamic driving movements, independently of the operation of the level adjustment device but when the level adjustment device is shut off.

What is common to all of the constructions according to the present invention is that, when the compressor function is switched on and a passage through the control valve means is opens, there is obtained an adjustment of the gas amount in the gas cushions of the resilient elements to a reduced carried load by supplying gas from a gas accumulator either directly or through the compressor, and an adjustment of the gas amount in the gas cushions of the resilient elements to an increased carried load by discharging gas into a gas accumulator either directly or through the compressor, until there is achieved the desired position of the separating pistons and a so-called level volume in the gas cushions. When the accumulator is selectively useable as a low-pressure and a high-pressure accumulator, one of the control valves of the control valve means must be closed while the other is open, in dependence on the loading condition of the gas in the respective gas cushion. However, both of these control valves can be open when it is assured that, when the pressure in the gas accumulator exceeds that in the respective gas cushions, the first connecting means is closeable by means of additional blocking means which is responsive to excess pressure and, when the pressure in the gas accumulator is below that in the respective gas cushions, the second connecting means is closeable by means of additional blocking means which is responsive to lowered pressure.

After the performance of the level adjustment in the above-discussed manner, the control valves are advantageously closed, and an inclination regulation can be accomplished in the following manner.

In the two resilient elements which constitute a resilient group, the separating piston of the resilient element which is extended is displaced out of the desired position and the separating piston of the resilient element which is retracted is displaced into the gas cushion by the driving conditions influenced by the mass forces, wherein the gas amount in the extended resilient element deviates by the amount of the outward displacement volume and the gas amount in the retracted resilient element deviates by the amount of the inward displacement volume from the level amount. When the compressor function is switched on, the position regulating elements, which detect the position of the separating piston or the gas cushion volume in any known manner, connect the discharge conduit of the extended resilient element through the inlet chamber and the outlet chamber of the compressor with the supply conduit of the retracted resilient element. As a result, there can take place, with the aid of the compressor, gas transfer from the extended to the retracted resilient element, wherein the gas volume of the extended resilient element is reduced in the direction toward the level volume, and the gas cushion of the retracted resilient element increases in the direction toward the level volume. It is a characteristic feature of the present invention that, given the same level volumes in both of the resilient elements and isothermal condition changes of the gas, the level volume is simultaneously obtained again in both of the resilient elements as soon as there is transferred a gas amount which is determined by the pressure reduction in the previously extended resilient element, the corresponding pressure increase in the previously retracted resilient element, and the amount of the level volume. This amount of gas will be designated here as a trimming amount. However, even if the change instate is Polytropic, the level volume will be achieved in each of the resilient elements substantially simultaneously, as soon as the trimming amount is transferred.

The gas transfer from the extended into the retracted resilient element can be achieved with a low energy consumption and so quickly that the superstructure remains practically parallel to the roadway even if the vehicle is subjected to conditions which are influenced by mass forces.

After the termination of the above-mentioned driving condition, there occurs during travel in a straight course a return flow of the trimming amount from the previously retracted resilient element into the previously extended resilient element, so that the level volume is again achieved in both of the resilient elements.

When resilient elements at the two sides of a vehicle axle form a resilient group, it is possible to achieve, by using the above-mentioned gas transfer, a righting of the superstructure up to the level position, that is, generally, parallel to the roadway, so that the same inward and outward displacement strokes are available while driving through a curve as during travel along a straight course. In this manner, therefore, the driving safety and driving comfort can be improved in an advantageous way.

It can be proven that the compressor output is so small that its contribution to the energy consumption of a motor vehicle is to b taken into consideration only in terms of a minute percentage proportion. The energy consumed by the compressor has only a negligible impact on the fuel consumption, inasmuch as the operation of the compressor occurs during the travel on relatively straight roads only at considerably spaced time intervals. The compressor work can be reduced when the drive of the compressor is provided with means which accepts and releases energy, for instance, in the form of a gyrating mass which stores energy during backflow of the gas and releases energy during the gas transfer.

When more than two of the resilient elements are combined into a resilient group, for instance, in a four-wheel vehicle which is fully equipped with a resilient arrangement according to the present invention, the outlet conduits of all of the resilient elements scan be commonly connected to the outlet chamber, while the inlet conduits of the resilient elements can be commonly connected to the inlet chamber of the compressor, and connecting conduits to the aforementioned gas accumulator may be provided and equipped with closing valve devices. Then, in all driving conditions which are influenced by mass forces, that is, during the driving through curves as well as during acceleration or deceleration, the superstructure can be righted in the above-discussed manner up to the position in which it is parallel to the roadway, or can be maintained parallel thereto, in that the trimming amount which is required in each instance is withdrawn from the extended resilient elements and is transferred into the retracted resilient elements, or it flows back, all of this happening when the closing devices are closed.

Actually, the gas transfer and the gas back flow could also take place during the above-mentioned driving conditions even if the closing devices were open. However, a constant gas exchange with the gas container would be connected with this expedient, and this is not desired and would require much more compressor output than the operation with the closing devices assuming their closed states.

When the separating pistons of all of the resilient elements have reached their desired positions and no trimming gas amount is needed, the compressor, which in this case would be equipped with a correspondingly large idle space which limits the compression ratio, could also operate constantly. Even other means which are known from the compressor design and construction field could be provided for the purpose of an interrupted gas flow when the compressor is running.

Inasmuch as the required trimming amounts are relatively small and the resistance coefficients of a gas flow are in any event rather low, the discharge and supply conduits may be made with relatively small inner diameters, for instance, in passenger cars, with diameters substantially corresponding to those usually employed in the conventional brake lines of a hydraulic brake facility.

In an advantageous manner, it is possible, in a fully loaded application of the present invention for an axle or for all axles or wheels of the vehicle, to dispense with other currently customary resilient stabilizing means which become effective mainly in curves or during acceleration or deceleration of the vehicle, for instance, in the form of torsion bars, when no or only a negligible tilting of the superstructure takes place in vehicles of this type due to the correspondingly rapid transfer and return flow of the trimming amount of gas. It is further advantageous that, in this manner, there can be avoided the hardening of the individual wheel suspensions by such stabilizing resilient means.

When a distribution of the superstructure weight takes place in a motor vehicle equipped with more than three wheels, for instance, with four wheels, to four fully loaded hydropneumatic resilient elements and all of the resilient elements are provided independently of one another with a level regulator each, there can occur a dangerous equilibrium condition in which two resilient elements which are situated diagonally oppositely to one another would carry the superstructure by themselves or almost by themselves and the wheels which are associated with the two other resilient elements would have no or only a small degree of roadway surface adherence. This driving condition is eliminated in the known hydropneumatic fully loaded suspensions mostly in such a manner that two resilient elements of one axle are connected with one another on the oil side and only three elevation regulators are being used. In the regulating arrangement according to the present invention, the gas cushions of the individual resilient elements are connected with one another from time to time during oscillations of the superstructure, so that the above-mentioned equilibrium situation, which is connected with the loss of the roadway surface adhesion, cannot occur. Rather, an optimum distribution of the superstructure weight to all four wheels is automatically adjusted in an advantageous manner with the respective center of gravity location, in that pressure differences in the gas cushions of the resilient elements are equalized up to the smallest possible pressure difference, wherein one of the resilient elements always reaches the level volume last.

When the wheel loads of the associated resilient elements are very different, for instance, those of the front axle and those of the rear axle, or also for different reasons the piston surfaces which carry the wheel load and are reduced to the wheel, are chosen to have different sizes, even the level volumes are advantageously chosen to be proportional to the piston surfaces, inasmuch as the trimming amounts of such resilient elements have the same magnitude in this case.

During concurrent vehicle movement, for instance, even during dipping or pitching or wobbling oscillations, a direct gas exchange is possible due to the presence and action of the position regulating elements between the gas cushions of simultaneously outwardly or inwardly moving resilient elements having different pressures, as a result of which there could occur undesirable wheel load changes. In order to avoid this, check valves can be interposed between the discharge conduits and the inlet chamber of the compressor, these check valves opening toward the inlet chamber, and/or between the supply conduits and the outlet chamber of the compressor, such check valves then closing in the direction toward the outlet chamber.

The check valves arranged upstream of the inlet chamber thus prevent gas exchange between simultaneously extended resilient elements, and the check valves arranged upstream of the outlet chamber thus prevent gas exchange between simultaneously retracting resilient elements.

When it is required, in a vehicle with a suspension according to the present invention for four or more wheels, that the wheel loads of two or more resilient elements have the same magnitude, there can be provided connecting conduits between the supply conduits or between the discharge conduits. A a result of this expedient, a gas exchange takes place during each inward or outward displacement of the associated resilient elements and established equal wheel loads. When this operation is to be performed with a delay, the connecting conduits can be provided with respective throttling devices. In an arrangement of these connecting conduits, there is maintained the stabilizing effect that the compressor transfers gas from the outwardly displaced into the inwardly displaced resilient elements for compensation of vehicle tilting. The same wheel loads can also be achieved when the check valves are omitted or are provided with throttling openings, for instance, in the form of leakage gaps.

Further details, explanations and exemplary numerical values, especially also for proving the small compressor output required, which are not required for the understanding of the present invention, can be ascertained from the German patent application No. DE-OS No. 36 04 068 which, published on Aug. 13, 1987.

BRIEF DESCRIPTION OF THE DRAWINGS

The present invention will be described below in more detail with reference to the accompanying drawings in which.

DETAILED DESCRIPTION OF THE PREFERRED EMBODIMENT

Referring now to the drawings in detail, and first to FIGS. 1 to 6 thereof, it may be seen that they depict two resilient elements or units of a resilient group. These resilient elements are to be considered as left and right resilient elements of a vehicle axle. The same reference numerals have been used to identify the corresponding parts on the left and on the right. Unless necessary for better understanding of the construction, the reference numerals have not been duplicated. On the other hand, when it is required to differentiate between the corresponding parts, then the reference numeral identifying the respective part on the right side of the arrangement is supplemented with a prime, while the one on the left side of the arrangement is not.

Figures 1, 2, 3:
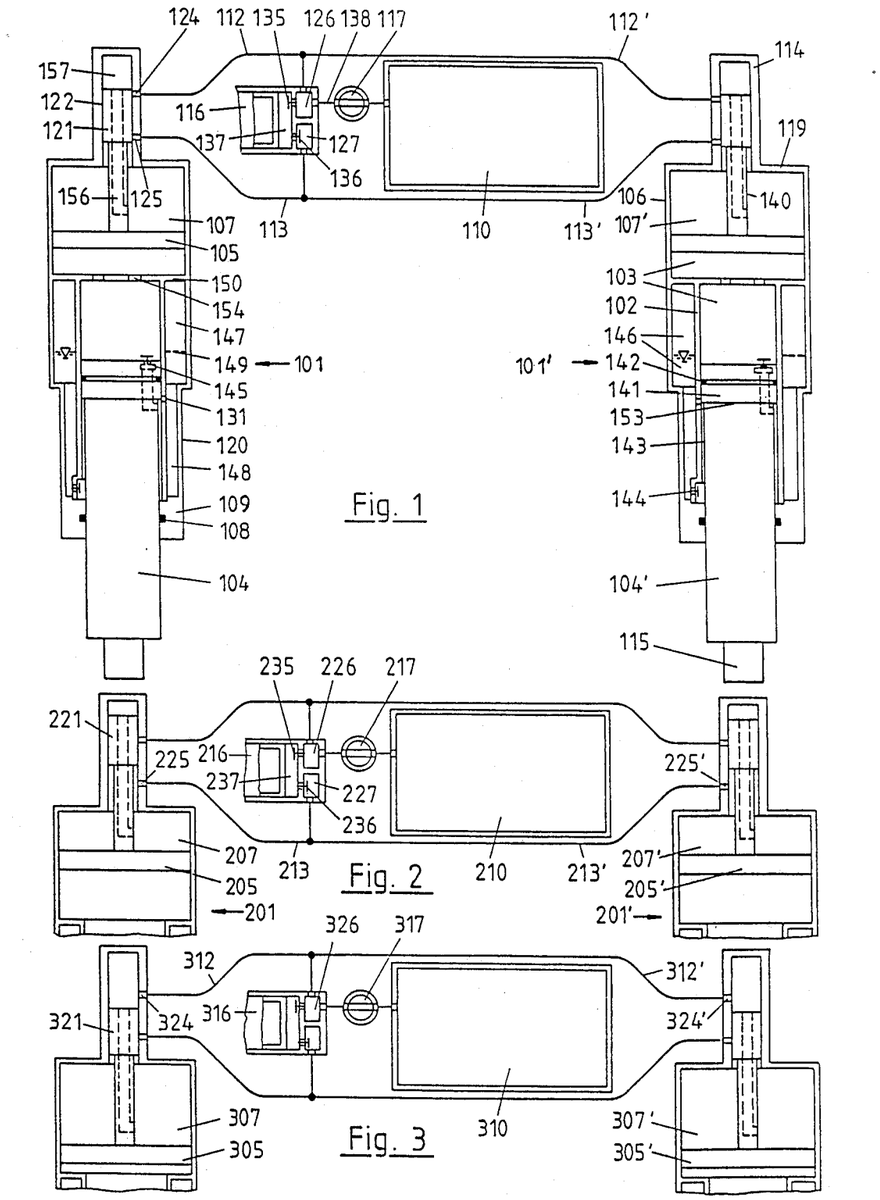
FIG. 1 is a somewhat diagrammatic partially sectioned front side elevational view of a resilient group including two resilient elements which are associated with a low-pressure accumulator, with separating pistons in their desired positions.
FIG. 2 is a view similar to FIG. 1 but only of a fragment of the resilient group and with the separating pistons retracted due to an increased load an a closing device shown open.
FIG. 3 is a view similar to FIG. 2 but with the separating pistons extended due to a reduced load.

A resilient group according to FIG. 1 is provided with two hydro-pneumatic resilient elements or units 101 and 101'. The resilient elements 101 and 101' are provided with respective connecting locations in the form of connecting pins 114 and 115. Each of the resilient elements 101 and 101' is provided with an oil quantity 103 which is confined in a working cylinder 102. A working piston 104 is slidingly received in the working cylinder 102, passes to the exterior of the working cylinder 102 through a cylinder lid 109 which is provided with a seal 108, and is operative for displacing oil out of the interior of the working cylinder 102. Each of the resilient elements 101 and 101' is further provided at a side thereof which is opposite to the respective working piston 104 or 104' with a respective gas cushion 107 and 107'. The gas cushion 107 or 107' is sealing separated from the oil quantity 103 by a separating piston 105 and is confined in a housing 106 which includes an outer wall 119. The housing 106 receives the oil which is displaced by the working piston 104 out of the working cylinder 102. The oil quantity 103 is subdivided into two parts by a partitioning wall 150 which is provided with throttling orifices 154 that serve for oscillation damping.

Each of the resilient elements 101 and 101' further includes a position regulating element in the form of a control slide 121 which is held on the separating piton 105 by means of a control rod 140 and which is slidingly displaceable with respect to a control sleeve 122 which is located within the connecting pin 114 that is connected with the outer wall 119. The control sleeve 122 is provided with an upper control opening 124 which communicates with a discharge conduit 112 or 112', and with a lower control opening 125 which communicates with a supply conduit 113 or 113'. The control sleeve 122 has a free space 157 situated upwardly of the control slide 121 and connected with the gas cushion 107 or 107' by a channel 156 provided in the control rod 140.

The discharge conduits 112 and 112' of the two resilient elements 101 and 101' are commonly connected with an inlet chamber 126 of a compressor 116, and the supply conduits 113 and 113' are commonly connected with an outlet chamber 127 of the compressor 116. The compressor 116 includes an inlet valve 135, an outlet valve 136 and a compression chamber 137. A low-pressure accumulator 110 is connected with the inlet chamber 126 of the compressor 116 through a connecting conduit 138 which is provided with a closing arrangement in the form of a turnable slide 117. The turnable slide 117 includes an open passage. In FIG. 1, the separating pistons 105 at the right and at the left are in their desired positions, in which both of the control openings 124 and 125 are closed by the control slide 121, so that no gas exchange is possible between the respective gas cushions 107 or 107' and the low-pressure accumulator 110.

When, as shown in FIG. 2 of the drawings in which reference numbers raised by 100 relative to those used in FIG. 1 are being used to identify corresponding parts, the separating pistons 205 and 205' are resiliently displaced inwardly or upwardly as shown, the lower control openings 225 and 225' are uncovered by the control slides 221, and there exists a connection of the gas cushions 207 and 207' of the two resilient elements 201 and 201' through the supply conduits 213 and 213' the outlet chamber 227, the outlet valve 236, the compression space 237, the inlet valve 235, the inlet chamber 226 and the then open turnable slide 217 with the low pressure accumulator 210. When the compressor 216 is in operation, the outlet chamber 227 serves as a gas source and there can occur a return displacement of the separating pistons 205 and 205' into their desired positions shown in FIG. 1 of the drawings in any arbitrary succession, and a level regulation by an increase of the gas amounts in the gas cushions 207 and 207'.

When, as shown in FIG. 3 of the drawings in which reference numbers raised by 100 relative to those used in FIG. 2 are being used to identify corresponding parts, the separating pistons 305 and 305' are resiliently displaced outwardly or downwardly as shown, the upper control openings 324 and 324' are uncovered by the control slides 321, and there exists a connection of the gas cushions 307 and 307' through the discharge conduits 312 and 312', the inlet chamber 326, and the then open turnable slide 317 with the low pressure accumulator 310 which acts as a gas sink, so that there can occur a return displacement of the separating pistons 305 and 305' into their desired positions shown in to FIG. 1 of the drawings in any arbitrary succession, and a level regulation by a decrease of the gas amounts in the gas cushions 307 and 307'.

Figure 4:
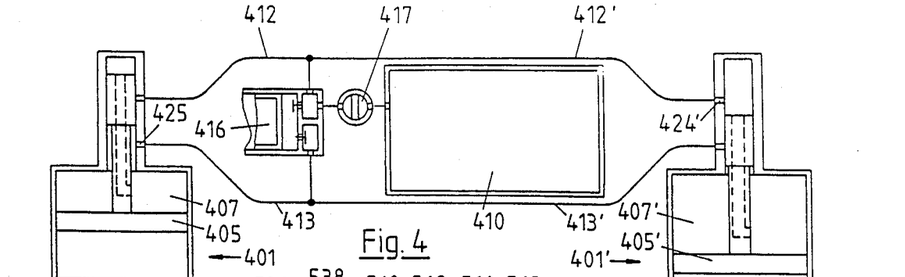
FIG. 4 is a view similar to FIG. 3 but with one of the separating pistons retracted and the other extended due to driving conditions influenced by mass forces, and with the closing device closed.

When, as shown in FIG. 4 of the drawings in which reference numbers raised by 100 relative to those used in FIG. 3 are being used to identify corresponding parts, the left separating piston 405 is resiliently displaced upward and the right separating piston 405' is resiliently displaced, downwardly as considered in the illustrated position for instance during the performance of a right turn, due to the additional loading of the resilient element 401 and its attendant retraction and the reduced loading of the resilient element 401' and its attendant extension, the lower control opening 425 at the left and the upper control opening 424' at the right are uncovered by the respective control slides 421 and 421', and there exists a connection of the gas cushion 407 at the left with the gas cushion 407' at the right through the left supply conduit 413, the compressor 416 and the right discharge conduit 412'. Under these circumstances, the turnable slide 417 is closed, as shown in FIG. 4, after the level regulation of the carried load has been accomplished in the manner discussed above in conjunction with FIGS. 2 or 3 of the drawings, and no connection exists between the gas cushions 407 and 407' and the low-pressure accumulator 410. At this time, there can be accomplished a return displacement of the separating pistons 405 and 405' into their desired positions by transfer of a trimming amount of gas with the aid of the compressor 416 from the right to the left, that is, from the gas cushion 407' whose gas amount is reduced into the gas cushion 407 whose gas amount is increased, and there thus can occur a righting of the superstructure up to the desired position. When, after the completion of the right turn, the additional loading of the resilient element 401 and the reduced loading of the resilient element 401' are discontinued, the position of the separating pistons 405 and 405' is reversed, and there exists a connection of the left gas cushion 407 with the right gas cushion 407' through the left discharge conduit 412, the compressor 416 and the right supply conduit 413'. At this time, there can be accomplished a return of the separating pistons 405 and 405' by the return transfer of the trimming amount of gas, with or without the aid of the compressor 416, from the left to the right, that is, from the gas cushion 407 whose gas amount is reduced again into the gas cushion 407' whose gas amount is increased again.

The resilient elements have additional features which do not fall within the scope of protection of the present invention and will not be discussed here.

Turning now back to FIG. 1 of the drawings, it may be seen that each of the working pistons 104 and 104' is provided with a piston head 141 which is guided in the working cylinder 102 and is sealed with respect to the latter by a sliding seal 142. The working pistons 104 and 104' form with the working cylinder 102 an annular pumping space 143 whose pumping piston is constituted by an annular surface 153 of the piston head 141. An oil accumulator 146 is disposed between the cylinder lid 109 and the partitioning wall 150. The oil accumulator 146 surrounds the working cylinder 102 and is surrounded by an outer pipe 120. The oil accumulator 146 is provided at its lower portion with an oil filling 148 and at its upper portion with a gas filling 147 which is under pressure. A free oil upper level 149 is situated between the oil filling 148 and the gas filling 147. The pumping space 143 is connected with the oil filling 148 through a suction valve 144 and with the oil quantity 103 through a pressure valve 145. In addition, the pumping space 143 is connected with the oil quantity 103 through a throttling opening 131 which passes through the working cylinder 102 and is controlled by the piston head 141. In the position shown in FIG. 1 of the drawings, the throttling opening 131 is open half by the piston head 141. During swinging movements of the working piston 104, oil is drawn from the oil accumulator 146 and is supplied into the oil quantity 103, and oil flows back from the oil quantity 103 into the oil accumulator 146 through the throttling opening 131 as soon as the piston head 141 uncovers the throttling opening 131 during the resilient extension of the working piston 104. Herein, there is accomplished an equilibrium and an oil level regulation is effected, wherein the regulated level may correspond to the illustrated position of the resilient piston 104. The work performed by the pumping space 143 constitutes a load-depended damping and improves the damping properties.

Figure 5:
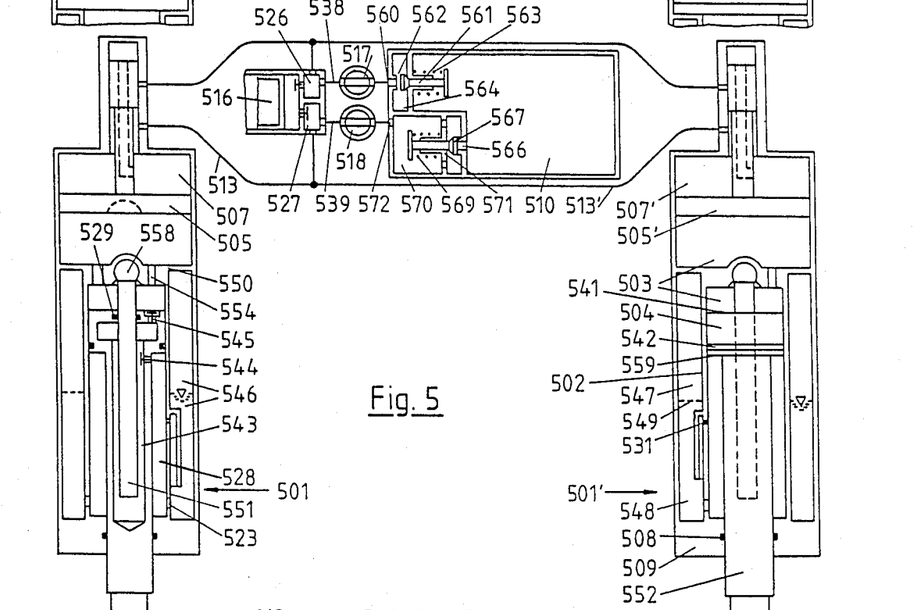
FIG. 5 is a view similar to FIG. 1 but having resilient elements of modified constructions, which cooperate with an accumulator of an arbitrary pressure, the accumulator acting as a low-pressure accumulator in this instance.

In the arrangement of FIG. 5, in which the reference numbers have once more been increased by 100 with respect to those employed in FIG. 4, the parts of the arrangement group of FIG. 1 have been identified by reference numerals only in the case of need according to the invention, a gas container 510, which is effective as a low-pressure accumulator, is connected through a connecting conduit 538 which is equipped with a first turnable slide 517 with an inlet chamber 526 of a compressor 516, and through a second connecting conduit 539 which is provided with a second turnable slide 518 with the outlet chamber 527 of the compressor 516. The connecting conduit 538 opens via inlet channel 560 which is closeable by a valve 561 into a valve chamber 564 which is in open communication with the gas container 510. A valve spring 563 has the effect that a valve gap 562 exists between the inlet channel 560 and the valve 561. Because of this, when the turnable slide 517 is open, as illustrated, there can be accomplished a return displacement of the separating pistons 505 and 505' in exactly the same manner as described above in conjunction with FIG. 2 of the drawings. The connecting conduit 539 opens via an outlet opening 572 into a valve chamber 570 which is provided with a holding component 571 for a valve 567, and chamber 570 is connected through an outlet channel 566 which is closeable by the valve 567 with the gas container 510. A valve spring 569 is provided and is constructed to be so weak that, at a predetermined excess pressure of the gas cushions 507 and 507', the valve 567 keeps the outlet channel 566 closed. Thus, despite the open condition of the turnable slide 518, as illustrated, and the reduced pressure in the gas container 510, there can be accomplished return displacement of the separating pistons 505 and 505' due to the flow through the supply conduits 513 and 513'. When there is encountered the case that the pressure in the gas container 510 is higher than that in the gas cushions 507 and 507' and thus the gas container 510 is effective as a high-pressure accumulator, the valve gap 562 can remain open under the influence of the valve spring 563, the valve 567 is displaced outwardly against spring 569 by the excess pressure in the gas container 510, and an increase in the gas quantities in the gas cushions 507 and 507' can take place directly from the gas container 510 through the outlet channel 566 which is open under these circumstances.

Figure 6:
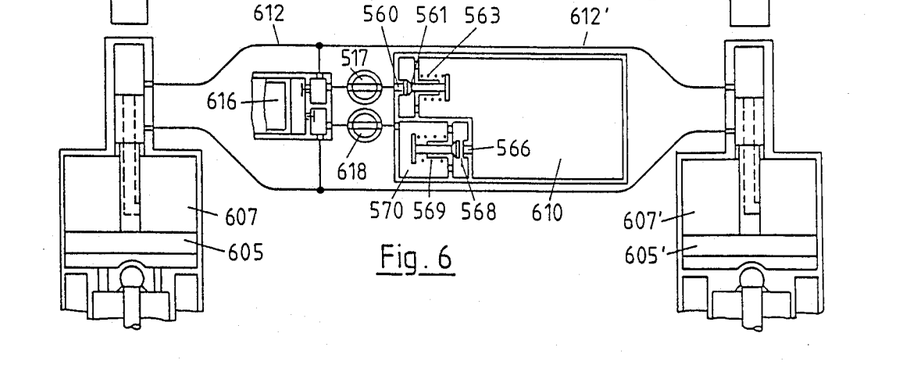
FIG. 6 is a view similar to FIG. 5 but only of a fragment threre of and with the separating pistons extended, the accumulator acting as a high-pressure accumulator in this instance.

In the arrangements according to FIG. 6, in which some of the reference numbers have once more been increased by 100 with respect to those employed in FIG. 5, there is accomplished a blowing-off of gas from the gas cushions 607 and 607' through the outlet conduits 612 and 612', the then operating compressor 616, the then open turnable slide 618 an the valve chamber 570 against the elevated pressure of the gas container 610. Herein, a valve gap 568 exists between the valve chamber 570 and the outlet channel 566 due to the influence of the valve spring 569. The excess pressure in the gas container 610 holds the inlet channel 560 closed by means of the valve 561 against the correspondingly elected weak spring force of the valve spring 563. Thus, despite the open condition of the turning slide 517 and the excess pressure in the gas container 610, it is possible to achieve the return displacement of the separating pistons 605 and 605' due to the action of the outlet conduits 612 and 612'.

The resilient elements 501 and 501' exhibit other features which do not fall under the scope of protection of the invention and will not be discussed here. The working pistons each are constructed as a stepped piston 504 which is guided in a working cylinder 502 and is sealed by a seal 542. The stepped piston 504 has a piston rod 552 which extends to the exterior of the working cylinder 502 through a cylinder lid 509 which is equipped with a seal 508. The large circular surface 541 of the stepped piston 504 displaces oil out of the oil quantity 503 that is enclosed in the working cylinder 502 and that is subdivided by a separating wall 550 provided with throttling openings 554. The piston rod 552 forms with an working cylinder 502 an annular space 528, from which the annular surface 559 displaces oil into an oil accumulator 546 which surrounds the working cylinder 502 through openings 523 arranged a the region of the cylinder lid 509. Herein, the oil accumulator 546 is provided at its lower portion with an oil filling 548 and at its upper region with a gas filling 547 which is subjected to pressure, while a free oil upper level 549 is present between the two fillings 548 and 547. The force exerted by the pressure of the gas filling 547 on the annular surface 559 acts as a pulling force for the piston rod 552, so that the resilient elements 501 and 501' are subjected to a carrying load equal to the pressure force with which the gas cushion 507 acts on the large circular surface 541 less the pulling force of the annular surface 559.

The piston rod 552 which is hollow forms a pump space 543, into which there extends a pumping plunger 551 which is connected to the intermediate wall 550 by means of a ball joint 558. The pumping plunger 551 is sealed by a seal 529. The pumping space 543 is connected with the annular space 528 through a suction valve 544 and with the oil quantity 503 through a pressure valve 545, and is additionally connected with the pressure accumulator 546 through a throttling opening 531 provided in the working cylinder 502 and controlled by the stepped piston 504. The pumping plunger 551 and the pumping space 543 have the same effects as described above with respect to the annular surface 159 and the pumping space 143 of the resilient elements according to FIG. 1.

Throttling openings 154 or 554 provided, according to FIGS. 1 or 5, in the intermediate walls 150 or 550, serve for a determination of the resilient and damping actions. These throttling openings 154 or 554 produce speed-dependent damping forces. Load-dependent damping forces are constituted in the self-pumping resilient elements, in a known manner, by the pumping work of the annular surface 159 of the piston head 141 according to FIG. 1 or of the pumping plunger 551 according to FIG. 5, and they can be varied by the size of the respective pumping surface or also by the throttling resistances of the suction and pressure valves 144 and 145 or 544 and 545. In the regulation in accordance with this invention, the gasside connection of the resilient elements has an influence on the damping forces, especially during low-frequency superstructure oscillations. Namely, when pressure differences are encountered, during alternating oscillations (compare FIG. 4) of a superstructure or during oscillations of the same sence (compare FIGS. 2. and 3), in the gas cushions of the associated resilient elements and a gas transfer takes place from one to the other of the resilient elements, the carried loads of the resilient elements are changed thereby and difference forces are created which appear as damping forces. This situation can be utilized for the determination of the resilience and damping, especially also in that the response sensitivity which determines the oscillations without gas transfer is varied during the return of the separating pistons toward their desired positions, in that, for instance, the overlaps of the control slide 121 and of the control openings 124 and 125 are selected to be correspondingly large. As a result of this, it can also be prevented that, when the pressure differences between the associated resilient elements are considerable, too much gas would flow in a disturbing manner from the gas cushion having the higher pressure to the gas cushion having the lower pressure. In order to influence this, throttling devices or locations may also be provided in the supply conduits or in the discharge conduits.

Figure 7:
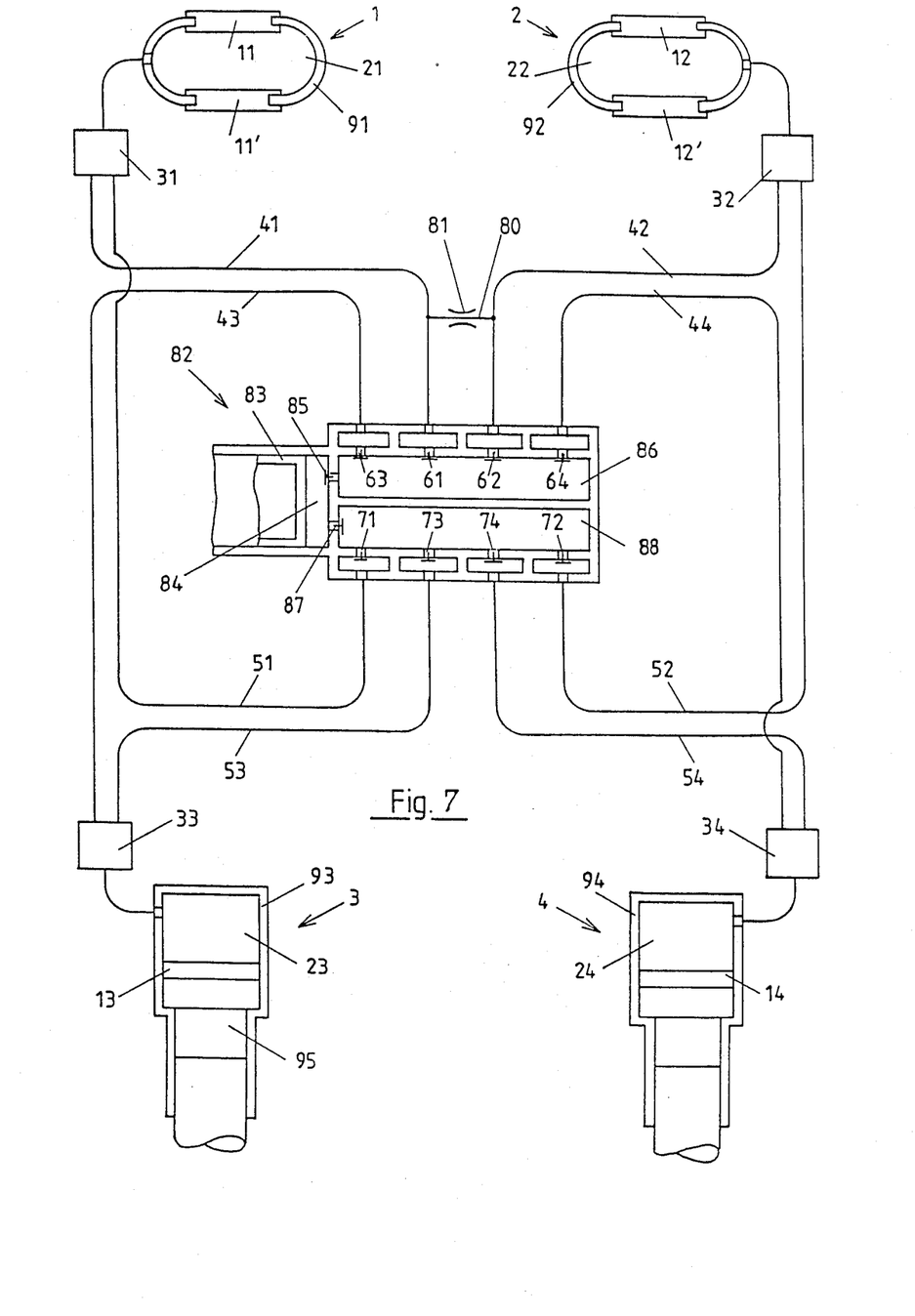
FIG. 7 is a partially sectioned developed view of an arrangement of the present invention including position regulating elements and check valves in on inlet chamber and in on outlet chamber.

Two presumably frontward pneumatic resilient elements 1 and 2 which are shown in FIG. 7 include gas cushions 21 and 22 which are enclosed in housing 91 and 92 which correct respective upper separating pistons 11 and 12 with associated lower separating pistons 11' and 12' for movement together and apart. The pistons 11 and 12 or 11' and 12' are loaded toward one another by the pressure exerted thereon by the wheel load and away from each other by the pneumatic pressure of the gas cushions 21 and 22. Two presumably rearward pneumatic resilient elements 3 and 4 include gas cushions 23 and 24 which are enclosed in housing 93 and 94, and separating pistons 13 and 14, which are loaded at the side of hydraulic working cylinders 95 that are filled with oil by the wheel load and at the opposite side by the pneumatic pressure of the gas cushions 23 and 24. The gas cushions 21, 22, 23 and 24 are connected with position regulating elements 31, 32, 33 and 34 of a known construction, which detect the position of the separating pistons 11, 12, 13 and 14 and, in response to a deviation from a desired position, establish a communication with discharge conduits 41, 42, 43 or 44 or with supply conduits 51, 52, 53 or 54. Each of the discharge conduits 41, 42, 43 and 44 individually opens into an inlet chamber 86 of a compressor 82 through check valves 61, 62, 63 and 64 which open in the direction toward the inlet chamber 86. Each of the supply conduits 51, 52, 53 and 54 individually opens into an outlet chamber 88 of the compressor 82 through check valves 71, 72, 73 and 74 which close in the direction toward the outlet chamber 88. The compressor 82 includes a compressing piston 83 and a compressor cylinder 84, from which an inlet valve 85 connects to the inlet chamber 86 and an outlet valve 87 leads into the outlet chamber 88. A connecting conduit 80 is provided between the discharge conduits 41 and 42 at the region of the check valves 61 and 52. The connecting conduit 80 is equipped with a throttling arrangement 81.

The position regulating elements 31, 32, 33 and 34 are so arranged and switched that, in the event of a deviation of the separating pistons 11, 12, 13 and 14 from their desired positions which has been caused by the respective resilient element having been extended, they establish connection of the gas cushions 21, 22, 23 and 24 with the discharge conduits 41, 42, 43 and 44 and, in the event of a deviation caused by the resilient element being retracted, they establish connection of the gas cushions 21, 22, 23 and 24 with the supply conduits 51, 52, 53 and 54. The compressor 82 delivers gas directly from the gas cushions of the resilient extended resilient elements into the gas cushions of the resiliently retracted resilient elements in order to compensate for the vehicle tilting during dynamic vehicle movements. At this time, one or more of the check valves 61, 62, 63 and 64, and 71, 72, 73 and 74 open. For instance, when the resilient elements 2 and 4 are resiliently retracted and the resilient elements 1 and 3 are resiliently extended during a right-hand turn, gas is withdrawn from the gas cushions 22 and 24 through the discharge conduits 42 and 44 and supplied with the aid of the compressor 82 through the supply conduits 51 and 53 into the gas cushions 21 and 23, until the desired position of the separating pistons 11, 12, 13 and 14 is reached again. Herein, the check valves 62 and 64 which are interposed in the discharge conduits 42 and 44 prevent in an advantageous manner a pressure equalization between the gas cushions 22 and 24, while the check valves 71 and 73 associated with the supply conduits 51 and 52 prevent a gas equalization between the gas cushions 21 and 23. When, in accordance with the curve of the turn, the previously resilient extended resilient elements 2 and 4 become resiliently retracted and the previously resilient retracted resilient elements 1 and 3 become resiliently extended, gas flows from the gas cushions 21 and 23 through the discharge conduits 41 and 43 and the supply conduits 52 and 54 into the gas cushions 22 and 24, until the desired position of the separating pistons 11, 12, 13 and 14 is reached again. Herein, a position pressure differential exists for the return flow, and the compressor 82 may, but need not, be in operation. When the resilient elements 3 and 4 are resiliently extended and the resilient elements 1 and 2 are resiliently retracted as a result of a braking operation, the transport of the gas occurs in a manner which is the same as discussed above from the gas cushions 23 and 24 into the gas cushions 21 and 22 and, after the termination of the braking operation, gas transfer takes place instead back from the gas cushions 21 and 22 into the gas cushions 23 and 24. During braking in a curve, there occurs in a corresponding manner a gas transfer diagonally between the gas cushions 21 and 24, on the one hand, and the gas cushions 22 and 23, on the other hand.

When the carried loads of the resilient elements 1 and 2 are to be equal to one another, this is achieved by the connecting conduit 80 in that, during simultaneous resilient extension of both of the resilient elements 1 and 2 during pitching or diving of the motor vehicle, the pressure of the gas cushions 21 and 22 are connected to one another by means of the connecting conduit 80 through the discharge conduits 41 and 42. The connection of the gas pressures can be delayed in a desired manner by the throttling arrangement 81.

The subject matter of the construction according to FIG. 7 is exclusively inclination regulation, while a level regulation can be achieved in the manner discussed previously.

The inner spaces of the connecting conduits leading from the gas cushions to the position regulating elements constituted parts of the resiliently acting gas quantities. When these conduits are connected by the position regulating elements with the discharge or supply conduits, even the internal spaces of the discharge and supply conduits become part of the resiliently acting gas quantities. A result of this, the resiliently acting gas quantities can be deleteriously influenced under certain circumstances. to avoid this, the distance of the position determining elements from the compressor may be small or at least smaller than the distance of the resilient elements from the compressor. So, for instance, the position determining elements can be shifted very closely to the compressor and the influence of the gas quantities contained in the discharge and supply conduits on the resiliently acting gas quantity can be fully or substantially eliminated.

While the present invention has been described and illustrated herein as embodied in a specific construction of a motor vehicle suspension, it is not limited to the details of this particular construction, since various modifications and structural changes are possible and contemplated by the present invention. Thus, the scope of the present invention will be determined exclusively by the appended claims.

What is claimed is:

1. A level and inclination regulating arrangement for a vehicle, comprising a compressor having an inlet chamber and an outlet chamber;

at least two pneumatic or hydropneumatic resilient units each associated with one wheel of an axle of the vehicle and including a movable separating piston which is acted upon in one direction by the wheel load, and a housing supporting said separating piston and confining a gas cushion which exerts pneumatic pressure on said separating piston in the opposite direction;

separate supply conduit means and discharge conduit means for establishing connections of each of said gas cushions with said outlet chamber and with said inlet chamber of said compressor, respectively;

positions regulating elements respectively associated with said resilient units and operative for detecting the position of said separating piston with respect to a desired position and for controlling the discharge of gas from the respective gas cushion into said discharge conduit means and the supply of gas from said supply conduit means into the respective gas cushion in dependence on the deviation of the respective separating piston from said desired position thereof such that communication is established between the respective gas cushion and the respective supply conduit means when the force applied to the respective separating piston by the wheel load exceeds that exerted by said gas cushion with attendant movement of said separating piston from said desired position in said one direction, and between the respective gas cushion and the respective discharge conduit means when the force exerted on the respective separating piston by said gas cushion exceeds that applied by the wheel load with attendant movement of said separating piston from said desired position in said opposite direction;

at least one accumulator;

means for connecting said accumulator to at least one of said conduit means as a separate brand thereof which communicates with the respective one of said chambers with attendant gas transfer during a level adjustment operation of the arrangement between said accumulator and said gas cushion of that of said resilient units whose separating piston has been moved out of said desired position thereof by a change in the vehicle load; and selectively operable closing valve means interposed in said connecting means and operative for selectively interrupting communication between said accumulator and said one conduit means with attendant transfer of gas during an inclination adjustment operation of the arrangement exclusively from said gas cushion of that of said resilient units whose separating piston has been moved by the action of mass forces out of said desired position thereof in said opposite direction into said gas cushion of that of said resilient units whose separating piston has been moved out of said desired position thereof in said one direction.

2. The arrangement as defined in claim 1, wherein said accumulator is a low-pressure accumulator; wherein said connecting means connects said low-pressure accumulator in said discharge conduit means; and wherein said compressor directly transfers gas from said gas cushion of that of said resilient units whose separating piston is displaced in said opposite direction into said gas cushion of the other of said resilient units whose separating piston is displaced in said one direction when said closing valve means disconnects the gas volume of said low-pressure accumulator for an immediate compensation for vehicle superstructure inclination during dynamic driving movements.

3. The arrangement as defined in claim 1, wherein said accumulator is a high-pressure accumulator; wherein said connecting means connects said high-pressure accumulator in said supply conduit means; and wherein said compressor directly transfers gas from said gas cushion of that of said resilient units whose separating piston is displaced in said one direction into said gas cushion of the other of said resilient units whose separating piston is displaced in said one direction when said closing valve means disconnects the gas volume of said high-pressure accumulator for an immediate compensation for vehicle superstructure inclination during dynamic driving movements.

4. The arrangement as defined in claim 1, wherein said closing valve means includes first and a second closing valve for selectively incorporating said accumulator into said supply and discharge conduit means, respectively, to serve as one of a low-pressure and a high-pressure accumulator; and wherein a static level regulation takes place when the pressure in said accumulator is lower than that in the respective resilient unit with said first closing valve being open and said second closing valve being closed, and when the pressure in said accumulator is higher than that in the respective resilient unit with said first closing valve being closed and said second closing valve being open, while said compressor directly transfers gas from said gas cushion of that of said resilient units whose separating piston is displaced in said one direction into said gas cushion of the other of said resilient units whose separating piston is displace in said one direction when both of said first and second closing valves disconnect the gas volume of said accumulator for an immediate compensation for vehicle superstructure inclination during dynamic driving movements.

5. The arrangement as defined in claim 4, wherein both of said first and second closing valves are open for load equalization; and further comprising additional valve means in at least one of said supply and discharge conduit means for automatically closing off gas flow through said first closing valve when the pressure in said accumulator exceeds that in said resilient unit, in response to such reduced pressure, and through said second closing valve when the pressure in said accumulator is below that in said resilient unit, in response to such increase pressure.

6. The arrangement as defined in claim 1, wherein said position regulating elements are constituted by self-positioning control slides which are connected with the respective separating pistons.

7. The arrangement as defined in claim 1, wherein said of said resilient units includes a cylinder and a piston movable in said cylinder; and wherein said resilient units fully support the vehicle superstructure and stabilize the same during conditions which are influenced by mass forces.

8. The arrangement as defined in claim 1, wherein said compressor is in operation during the level adjustment operation.

9. The arrangement as defined in claim 1, wherein said compressor is not in operation during the level adjustment operation.

* * * * *